United States Patent [19]

Zenobi

[11] Patent Number: 5,915,343
[45] Date of Patent: Jun. 29, 1999

[54] SYSTEM FOR THE RAPID COOLING OF ENGINES ON A TEST BENCH AND RELATIVE DEVICE

[75] Inventor: Mauro Zenobi, Perugia, Italy

[73] Assignee: Angelantoni Industrie SpA, Massa Martana, Italy

[21] Appl. No.: 09/015,913

[22] Filed: Jan. 30, 1998

[30] Foreign Application Priority Data

Feb. 10, 1997 [IT] Italy .................................. UD97A0028

[51] Int. Cl.$^6$ ........................................................ F01P 9/00
[52] U.S. Cl. ..................................... 123/41.01; 123/41.29; 73/116
[58] Field of Search .............................. 123/41.01, 41.29; 73/116, 118.1

[56] References Cited

FOREIGN PATENT DOCUMENTS

| 9112654 | 1/1992 | Germany . |
| 59-037439 | 2/1984 | Japan . |
| 59-037440 | 2/1984 | Japan . |
| 5937440 | 6/1984 | Japan . |
| 60-129141 | 7/1985 | Japan . |
| 63-005233 | 1/1988 | Japan . |
| 1666934 | 7/1991 | U.S.S.R. . |

OTHER PUBLICATIONS

MTZ Motortechnische Zeitschrift, vol. 50, No.11, Nov. 1989, Stuttgard DE, pp. 540–547, R. Stauber et al, "Neue BMW–Motorprufstande Zur Simulation Von Hohe Und Klima," p. 543.

*Primary Examiner*—Noah P. Kamen
*Attorney, Agent, or Firm*—Stevens, Davis, Miller & Mosher, L.L.P.

[57] ABSTRACT

A system for the rapid cooling of engines on a test bench used to carry out temperature testing, whether they be petrol or diesel engines, wherein, during the performance of the test with the engine switched on, the cooling liquid of the engine is made to circulate in a first cooling circuit which substantially reproduces the normal components and circuits to be found in the vehicle into which the engine (11) is installed and comprising at least a delivery pipe (13) in outlet from the engine (11) and equipped with pump means (14), a radiator system (15) cooperating with fan means (17), a feeder pipe (18) entering the engine (11) and equipped with valve means (24), a tank (19) to compensate for the heat expansion of the cooling liquid, and wherein, during the rapid cooling step which is carried out with the engine (11) switched off, the cooling liquid of the engine (11) is diverted into a second, auxiliary cooling circuit (25), comprising at least a heat exchanger (20) associated with a cooling unit (21) fed autonomously and inserted only at the rapid cooling step, a branch (26) which connects the delivery pipe (13) with the inlet of the heat exchanger (20) by way of a valve (22) which can be momentarily opened and a pipe (32) which connects the outlet of the heat exchanger (20) with the feeder pipe (18) of the engine (11), the cooling liquid being taken by the heat exchanger (20) progressively from the working temperature to the cooling temperature.

18 Claims, 1 Drawing Sheet

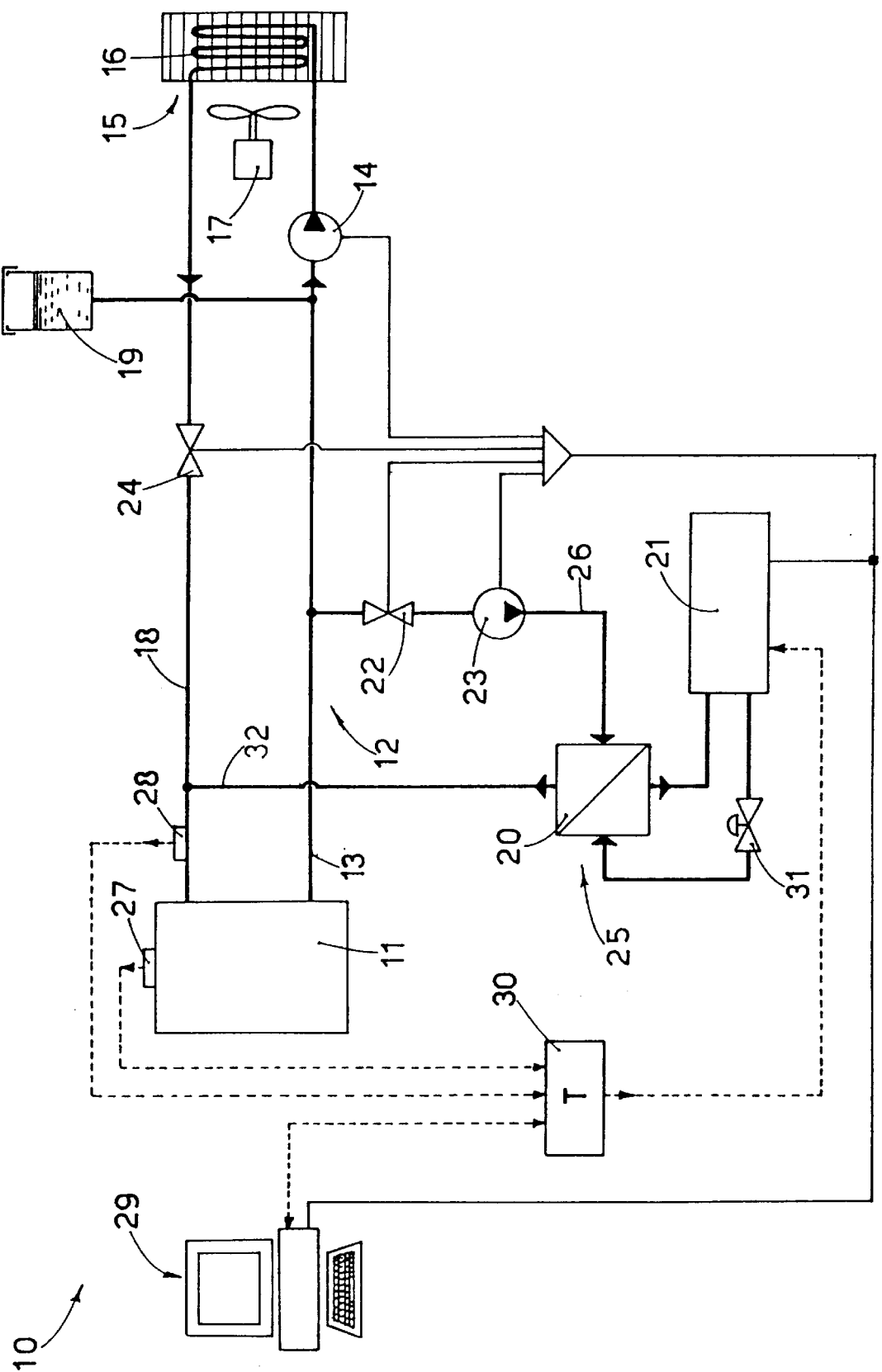

though the relative standards laid down by national
and international standards imposed in this field.

SYSTEM FOR THE RAPID COOLING OF ENGINES ON A TEST BENCH AND RELATIVE DEVICE

FIELD OF THE INVENTION

This invention concerns a system for the rapid cooling of engines on a test bench, and also a device which achieves the system.

The invention is applied in the field of motor vehicles, to perform temperature tests on internal combustion engines, whether they be petrol or diesel.

Such tests are carried out mainly, if not only, for the following two reasons. The tests are carried out to improve the starting characteristics of the vehicle under low temperature conditions. Also, the tests are carried out to reduce the emissions of polluting gases produced in the time the vehicle requires to reach working temperature, that is to say, in the period when the pollutant emissions are at their highest level.

The invention makes it possible, when such tests are done, to cool the engine in considerably shorter times than those obtained with systems which are used at the present. Thus, the invention ensures a considerable reduction in waiting times between one test and the next. The invention also achieves a considerable reduction in operating costs since a much greater number of tests can be carried out in the same length of time.

The invention, with its continuous and constant control of the working temperatures, also ensures conditions of absolute safety for the engine. The engine is protected from any possible heat stress which might damage the component parts or cause a deterioration in the functioning. This is an indispensable condition for achieving credible testing with results which can be compared.

BACKGROUND OF THE INVENTION

In the automobile field, and particularly in the field of engine production, the state of the art covers the testing of engines to check engine behavior under conditions which substantially reproduce those of actual use.

The tests are carried out on appropriate equipment which are controlled at least thermally and which comprise at least a test bench.

During the tests, working conditions are reproduced to substantially simulate the actual operating and environmental conditions to which the engine is subjected during normal use.

The tests are extremely important to verify the overall functionality of the engine, and make it possible to carry out different measurements of power, consumption, resistance to stress, etc.

To be more precise, temperature testing, that is, testing the functioning of the engine under conditions of extreme temperature to which the engine may be subjected, is extremely important.

Such tests must be able to verify the behavior of the engine under cold starting conditions. Such tests particularly verify the engines's polluting emissions. This is important, as it is well known that a very high percentage of pollutant gases is emitted when the engine is started cold, and during the time the engine takes to reach its working temperature.

Temperature tests may be carried out according to at least two operating conditions depending on the equipment and the method used.

In one operating condition, the engine must already be mounted on the vehicle.

This solution however has the disadvantage that the whole vehicle must be brought to the testing temperature; the automobile must be placed inside an air conditioned room or other suitable place where the temperature conditions required for the test can be reproduced.

Obviously, this procedure involves a very long time, both to bring the automobile-engine system to the required temperature and especially to cool the system down for the next test to be done.

Another situation is more advantageous. In this situation the engine is tested by itself, that is, it is not mounted on the vehicle. In this case it is coupled with an exhaust brake.

In this case too, the test is made inside a thermostatic room which is, however, smaller.

However, the engine is cooled only in the traditional manner, that is, by means of heat exchange by convection between the surface of the engine and the surrounding air which laps it inside the thermostatic room. Thus, the speed at which the temperature is varied is very slow, as the limits imposed by the process of convection limits this speed.

This contrasts with the operating and economic needs of performing successive cycles of heating and especially cooling as rapidly as possible. Increased rapidity would reduce waiting times between one test and another. However, increased rapidity should be gained without modifying the functional lay-out of the engine so as to ensure that the data obtained can be compared.

Document JP 59-37440 and DE 91 126 54 U show circuits to carry out heat stress on engines which are to be tested on a test bench.

In JP '440 there is an autonomous and separate heating circuit which supplies oil and liquid at temperature to the engine. This prevents the engine from seizing up during the high temperature test cycles.

There is also an autonomous and separate cooling circuit which supplies oil and liquid to the engine to cool it when the engine is stopped at the end of the test.

The presence of the autonomous heating circuit makes the test system complex and not very functional.

Moreover, it drastically increases energy consumption because it has to take the oil and liquid to a high temperature. It also increases installation costs because it needs to include the appropriate pipes with the relative valves and interception commands.

Furthermore, it does not explain how cooling takes place during the functioning of the engine.

Document DE '654 includes an autonomous and separate cooling circuit of the accumulation type. Thus, while the engine functions to perform the test, a part of the circuit for the subsequent rapid cooling accumulates liquid at low temperature to perform the subsequent cooling process.

Moreover, during the functioning of the engine in the test, cooling is carried out by the appropriate heat exchangers which can be adapted to the different engines.

This embodiment of the accumulation-type cooling circuit does not allow use of autonomous and separate cooling plants which accomplish, for example, the complete cooling of the test chamber where the tests are carried out. Nor does this embodiment allow other structures or services complementary and accessory to the test bench.

The use of heat exchangers for cooling purposes during the normal functioning of the engine does not enable testing of the engine in real conditions which completely reproduce actual functioning conditions. This makes the test not completely reliable and incomplete with respect to the effective working of all the components and all the auxiliary circuits of the engine.

SUMMARY OF THE INVENTION

The present inventors have designed, tested and embodied this invention to overcome the shortcomings of the state of the art, which businessmen in the field have particularly complained of, and to provide further advantages.

The purpose of the invention is to provide a system, and device, which drastically reduces the time required to cool an internal combustion engine subjected to temperature testing on a test bench, to limit waiting times between one test and another.

To be more exact, for the rapid cooling of the engine being tested, the invention uses the cooling liquid of the engine itself. In particular, the cooling liquid circulates by means of a high-capacity auxiliary cooling circuit provided for the purpose.

The auxiliary cooling circuit can be fed from the same cooling plant used to cool the whole climatic structure where the test takes place. In the alternative, the auxiliary cooling circuit can be fed from a cooling plant used to cool other structures or it can be fed by components complementary or accessory to the test bench used to carry out the test, without needing to use specific cooling plants.

During normal functioning of the engine, the cooling liquid circulates in a circuit which reproduces the normal cooling circuit of the vehicle. The circuit comprises a radiator system, fan means, connecting pipes, pumps, etc.

To be more exact, while the engine functions no structure or circuit other than the normal radiator carries out or participates in the cooling of the engine, the oil or the cooling liquid.

This ensures that the real functioning conditions of the engine when installed are closely adhered to. Thus, it is possible to faithfully reproduce the functioning of all the components and all the circuits of the engine. This guarantees the complete reliability and efficiency of the test.

The heat transported by the liquid is removed as the latter passes through the radiator. Then the cooled liquid is sent back to the engine. This maintains the test temperature, or the normal working temperature, of the engine substantially constant.

During the rapid cooling step, which follows the functioning step until the test temperature is reached, the cooling liquid of the engine is diverted into the auxiliary cooling circuit. The auxiliary cooling circuit is arranged substantially parallel to the normal cooling circuit consisting of the radiator. The auxiliary cooling circuit operates in an alternative and mutually exclusive manner with respect to the normal cooling circuit when the engine is switched off.

The cooling circuit comprises at least a heat exchanger, valve systems and pump systems. The heat exchanger is connected to a cooling unit which can be at least momentarily (temporarily) connected. The valve systems and pump systems, when activated, are suitable to divert and convey the cooling liquid towards the auxiliary cooling circuit.

The valves are of the servo-controlled type, activated electrically, pneumatically or of another type. Thus, the exchange between the two cooling circuits in the switch over from the normal functioning step with the engine activated to the rapid cooling step with the engine switched off may be automated.

The functioning of the system may be governed by a control and command group. A worker can employ this group to program cycles or curves of temperature reduction in the engine which are compatible with the characteristics of the system and which correspond to precise testing conditions.

In another embodiment the control and command group employs a module to control and regulate the temperature. The module is governed by means to monitor the temperature which are connected at least to the engine and to the pipe which feeds the cooling liquid to the engine itself.

A worker can employ the module to control and regulate the temperature to set the values of the temperature of the engine and also other parameters, such as the maximum difference between the temperature of the engine and that of the cooling liquid, or to set the cooling curve, while at the same time controlling the whole process. Thus, the invention avoids subjecting the engine to excessive heat stresses.

The invention therefore achieves with limited installation and running costs, a simple solution and a system with a very high efficiency so that a very high number of tests can be performed in a short time.

With the system according to the invention, it is possible to obtain, in an extremely short time, engine temperatures of −20/−25° C.

Moreover, gradual cooling occurs because the cooling liquid is not supplied by an accumulation system and therefore it initially arrives at the engine at a temperature similar to the working temperature and then progressively cools. This gradual cooling prevents heat stresses on the engine and safeguards the engine.

BRIEF DESCRIPTION OF THE DRAWING

FIG. 1 shows a non-restrictive example and illustrates in diagram form a preferred circuit of the system for rapid cooling of an engine on a test bench according to the invention.

DETAILED DESCRIPTION OF THE PREFERRED EMBODIMENT

The rapid cooling system 10 for engines 11 on a test bench is shown diagrammatically in its entirety in FIG. 1.

In this case, the engine 11 is associated with a first cooling circuit 12 comprising a delivery pipe 13. On pipe 13 there is normally a pump 14 to circulate the cooling liquid. The circuit 12 sends the liquid arriving from the engine 11 to the radiator system 15.

Inside the radiator system 15 the cooling liquid circulates in a coil 16 and gives up its heat, by convection, to the ambient air which laps the wall of the radiator system 15. Convection is assisted by action of the fan 17.

The cooling liquid is then re-introduced at a lower temperature into the engine 11 by means of a feeder pipe 18.

In cooperation with the cooling circuit 12, as in the state of the art, there is a tank 19 of liquid which serves to compensate for any expansion, caused by differences in temperature, of the liquid circulating in the pipes 13 and 18.

In this case, the rapid cooling system comprises a second cooling circuit 25 connected in parallel to the cooling circuit 12. Cooling circuit 12 and the second cooling circuit 25 operate in a mutually exclusive manner.

The second cooling circuit 25 comprises, in this case, a heat exchanger 20, a cooling unit 21, valve 22 and pump 23. At least the valve 22 is arranged on a branch 26 which connects an intermediate point of the delivery pipe 13 to the heat exchanger 20.

On the feeder pipe 18 of the cooling circuit 12 there also a valve 24.

The rapid cooling system 10 according to the invention functions as follows.

During the normal functioning of the engine 11, when the test is being made, the valve 24 is open and the valve 22 is closed.

The pump 14 functions when the engine is functioning and causes the cooling liquid in the first cooling circuit 12 to circulate normally. The cooling circuit 12 is the one which is normally assembled on the vehicle. Thus, it is possible to test the real functioning of all the components and circuits associated with the engine 11 once they have been assembled on the vehicle.

During this step, the pump 23 does not function, and nor does the cooling unit 21.

During the rapid cooling step, carried out for example to restore the temperature of the engine 11 for a new test, once the previous temperature test has been concluded, the engine 11 is switched off and the valve 24 is closed, while the valve 22 is opened and the pump 23 and the cooling unit 21 are activated.

Thus, the cooling liquid of the engine 11 circulates through the branch 26 to the heat exchanger 20 which is connected to the cooling unit 21.

The cooling unit 21 is autonomous and can be fed cooling medium from the same cooling plant used to cool the climatic test chamber where the tests are normally carried out on the engines 11.

The cooling liquid passes through the heat exchanger 20 to rapidly and intensely lower the temperature of the liquid. Thus, the liquid can be sent back to the feeder pipe 18 in a position downstream of the valve 24 by means of a pipe 32.

The cooling liquid supplied by the second cooling circuit 25 causes a cooling of the engine 11 in an extremely short time. This allows the rapid restoration of the most suitable temperature for a new test, for example a new cold start of the engine 11 or another type of test according to a substantially unlimited sequence.

Moreover, this cooling action is gradual. The liquid delivered to the engine 11 is initially at the higher working temperature and then gradually cools down, in a desired manner, because the cooling unit 21 lowers the temperature to the temperature necessary to obtain the desired temperature of the engine.

In this case, on the segment of pipe between the cooling unit 21 and the heat exchanger 20 there is a thermostatic expansion valve 31 (heat expansion valve 31).

The thermostatic expansion valve 31 may be governed by means to detect the temperature of the engine. This makes it possible to continuously define and control the curve of the reduction in temperature.

In this case, the functioning of the system 10 is governed by a control and command unit 29 which, for example, automatically commands the opening/closing of the valves 22, 24 and/or the activation of the pump means 14, 23, as well as that of the cooling unit 21.

In the embodiment shown, the control and command unit 29 is connected to a module to control the temperature 30. Module 30 receives the input of signals relating to the temperature of the engine 11, by means of the sensor 27, and receives the input of signals relating to the temperature of the cooling liquid sent to the engine 11, by means of the sensor 28. Sensor 28 is located on the pipe 18 in a position near the engine 11.

The control module 30 interfaces with the control and command unit 29 and allows values to be defined. For example, values may be defined to set the temperature of the engine 11 and maximum difference between the temperature of the engine 11, as measured by the sensor 27, and that of the cooling liquid as measured by the sensor 28.

It should be noted that if the engine 11 is injected with a liquid which is too cold, the heat stresses caused by the difference in temperature can break the engine 11.

If the limit value of the temperature difference is exceeded, the control and command unit 29 sends a signal to the cooling unit 21 to re-establish the correct cooling conditions.

By means of this module 30 to control and regulate the temperature it is therefore possible to set the desired curves for the reduction in the temperature of the engine 11. More precisely, this achieves the quickest cooling curve possible, while at the same time protecting the engine 11 from any possible harmful heat stresses.

I claim:

1. A system for the rapid cooling of engines on a test bench employed to carry out temperature testing, whether they be gasoline or diesel engines, the system comprising:

a first cooling circuit for circulating cooling liquid of the engine during the performance of the test with the engine switched on, which substantially reproduces the normal components and circuits to be found in the vehicle into which the engine (11) is installed, said first cooling circuit comprising at least a delivery pipe (13) in outlet from the engine (11) and equipped with a first pump (14), a radiator system (15) cooperating with fan means (17), a feeder pipe (18) entering the engine (11) and equipped with a first valve (24), a tank (19) to compensate for the heat expansion of the cooling liquid, and a second auxiliary cooling circuit (25) for cooling the cooling liquid of the engine during a rapid cooling step which is carried out with the engine (11) switched off, a heat exchanger (20) for progressively taking the engine cooling liquid from a working temperature to a cooling temperature during the rapid cooling step, a cooling unit (21) fed autonomously relative to the engine cooling liquid, at least one first conduit for bringing cooling medium from the cooling unit (21) to the heat exchanger (20), a second conduit for bringing cooling medium from the heat exchanger, (20) to the cooling unit (21), a second valve (31) for permitting cooling medium flow through said conduits only during the rapid cooling step, a branch (26) which connects the delivery pipe (13) with the inlet of the heat exchanger (20) by means of a third valve (22) for temporarily opening to divert cooling liquid of the engine to the second auxiliary cooling circuit (25) during the rapid cooling step, and a pipe (32) which connects the outlet of the heat exchanger (20) with the feeder pipe (18) of the engine (11).

2. The system as in claim 1, wherein the second auxiliary cooling circuit (25) is arranged in parallel with the first cooling circuit (12) and said system comprising said third valve (22) being a valve for operating said second circuit in an alternative and mutually exclusive manner to the first circuit (12).

3. The system as in claim 1 wherein said first valve (24) is located on the feeder pipe (18), and said third valve (22)

is located on the branch 26, for governing the diversion of the cooling liquid from the first cooling circuit (12) to the second auxiliary cooling circuit (25) and vice versa by at least the opening/closing of said first valve (24) on the feeder pipe (18) and by the opening/closing of the third valve (22) on the branch (26).

4. The system as in claim 1, wherein the first pump (14) and a second pump (23) are located for governing the diversion of the cooling liquid from the first cooling circuit (12) to the second auxiliary circuit (25) and vice versa by the activation/de-activation at least of the first pump (14) on the delivery pipe (13) and by the mating de-activation/de-activation of the second pump (23) on the branch (26).

5. The system as in claim 4, comprising a control and command unit (29) for governing the controlled activation/de-activation at least of the first valve (24) and the third valve (22) and the pumps (14,23).

6. The system as in claim 5, wherein the control and command unit (29) is functionally connected to a temperature control module (30) to define at least the curves and cycles of rapid cooling of the engine (11).

7. The system as in claim 6, wherein the temperature control module (30) has means for receiving as input at least signals relating to the temperature of the engine (11) and the temperature of the cooling liquid at the moment the cooling liquid is fed to the engine (11) to keep the difference in temperature between the cooling liquid and the engine (11) under control.

8. The system as in claim 1, wherein the temperature control module (30) has means for setting the maximum value of difference between the temperature of the engine (11) and the temperature of the cooling liquid at the moment when the cooling liquid is fed to the engine (11).

9. A device for the rapid cooling of engines on test benches employed to carry out temperature testing, whether they be gasoline or diesel engines, comprising:

a first circuit (12) for the circulation of cooling liquid of the engine (11), the first cooling circuit (12) substantially reproducing the components and circuits present in the vehicle where the engine (11) is installed and comprising at least a delivery pipe (13) in outlet from the engine (11) and equipped with a first pump (14), a radiator system (15) cooperating with fan means (17), a feeder pipe (18) entering the engine (11) and equipped with a first valve (24), a tank (19) to compensate for the heat expansion of the cooling liquid, at least a second auxiliary cooling circuit (25) for performing a rapid cooling step, comprising at least a heat exchanger (20) connected with a cooling unit (21), said cooling unit (21) being autonomous by circulating therein a cooling medium other than the engine cooling liquid, at least one first conduit for bringing said cooling medium from the cooling unit (21) to the heat exchanger (20) during the rapid cooling step, a second conduit for bringing said cooling medium from the heat exchanger (20) to the cooling unit (21) during the rapid cooling step, a second valve (31) for permitting cooling medium flow through said conduits only during the rapid cooling step, a branch (26) which connects the delivery pipe (13) with the inlet of the heat exchanger (20) by a third valve (22) for temporarily opening to pass said engine cooling liquid therethrough during the rapid cooling step, and a pipe (32) which connects the outlet of the heat exchanger (20) with a feeder pipe (18).

10. The device as in claim 9, further comprising a cooling plant used to cool the test chamber where the test is carried out on the engine (11) wherein the cooling unit (21) is fed said cooling medium by the cooling plant used to cool the test chamber where the test is carried out on the engine (11).

11. The device as in claim 9, comprising means for temporary closing the first valve (24) on the feeder pipe (18) in a manner which is functionally correlated with the opening of the third valve (22).

12. The device as in claim 9, wherein the branch (26) comprises a second pump (23) and means for momentarily activating the second pump (23) in a manner which is functionally correlated with de-activation of the fit pump (14).

13. The device as in claim 9, wherein at least one member of the group consisting of the first valve (24), the second valve (22), the first pump (14), and second pump (23) is of the servo-controlled type with remote control.

14. The device as in claim 9, which comprises a control and command unit (29) which at least governs the activation of at least one member of the group consisting of the third valve (22), the second valve (24), the first pump (14) and the second pump (23).

15. The device as in claim 9, which comprises a temperature control module (30) functionally connected to the control and command unit (29) to define at least the curves of the reduction in temperature of the engine (11).

16. The device as in claim 15, which comprises at least a sensor (27) to monitor the temperature of the engine (11) and a sensor (28) to monitor the temperature of the cooling liquid fed to the engine (11), the sensors being functionally governed by the temperature control module (30).

17. The device as in claim 9, wherein the second valve (31) comprises an electrically controlled valve (31) located between the cooling unit (21) and the heat exchanger (20).

18. The device as in claim 17, wherein the electrically controlled valve (31) is governed by means to detect the temperature of the engine.

* * * * *